United States Patent
Burk et al.

(10) Patent No.: US 10,252,787 B2
(45) Date of Patent: Apr. 9, 2019

(54) ELECTRIC POWER STEERING ASSIST AND CONTROL OF A MARINE VESSEL

(71) Applicant: STEERING SOLUTIONS IP HOLDING CORPORATION, Saginaw, MI (US)

(72) Inventors: Matt R. Burk, Bay City, MI (US); Nick R. Alpers, Saginaw, MI (US); David L. Westphal, Midland, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 119 days.

(21) Appl. No.: 15/221,262

(22) Filed: Jul. 27, 2016

(65) Prior Publication Data

US 2017/0029085 A1 Feb. 2, 2017

Related U.S. Application Data (60) Provisional application No. 62/197,784, filed on Jul. 28, 2015.

(51) Int. Cl.

| B63H 25/00 | (2006.01) |
|---|---|
| B63H 25/24 | (2006.01) |
| B63H 25/04 | (2006.01) |
| B62D 6/00 | (2006.01) |
| B63H 25/02 | (2006.01) |
| B63H 25/36 | (2006.01) |
| G05D 1/08 | (2006.01) |

(52) U.S. Cl.
CPC .............. *B63H 25/24* (2013.01); *B62D 6/008* (2013.01); *B63H 25/04* (2013.01); *B63H 25/36* (2013.01); *B63H 2025/022* (2013.01); *G05D 1/0875* (2013.01)

(58) Field of Classification Search
CPC .. B63H 25/04; B63H 2025/028; B63H 25/24; B63H 2025/022; B63H 25/36; B62D 6/008; G05D 1/0875
See application file for complete search history.

(56) References Cited

U.S. PATENT DOCUMENTS

| 6,138,596 | A | * | 10/2000 | Gonring | ................. | B63H 25/10 |
|---|---|---|---|---|---|---|
| | | | | | | 114/144 R |
| 2002/0103589 | A1 | * | 8/2002 | Millsap | ................. | B62D 5/006 |
| | | | | | | 701/42 |
| 2003/0000765 | A1 | * | 1/2003 | Spadafora | .............. | B62D 5/062 |
| | | | | | | 180/422 |
| 2003/0079668 | A1 | * | 5/2003 | Morvillo | ................. | B63H 11/11 |
| | | | | | | 114/151 |

(Continued)

*Primary Examiner* — Jason Holloway
(74) *Attorney, Agent, or Firm* — Cantor Colburn LLP (57) ABSTRACT

An embodiment of a system for controlling a marine vessel includes a torque and/or position sensor configured to measure at least one of a torque applied by a steering wheel of the marine vessel and a rotational position of the steering wheel, and a processing device configured to receive a measurement of the steering wheel and electronically control a steering mechanism at a stern region of the marine vessel. The processing device is configured to estimate an angle of the steering wheel, determine a corresponding angle to be applied to the steering mechanism, and transmit a steering command based on the corresponding angle to an actuation device at the stern region.

20 Claims, 4 Drawing Sheets

(56) References Cited

U.S. PATENT DOCUMENTS

| | | | |
|---|---|---|---|
| 2003/0191562 A1* | 10/2003 | Robertson | B63H 25/42 |
| | | | 701/21 |
| 2004/0031429 A1* | 2/2004 | Kaufmann | B63B 39/061 |
| | | | 114/144 RE |
| 2005/0199167 A1* | 9/2005 | Mizutani | B63H 25/02 |
| | | | 114/144 R |
| 2006/0217011 A1* | 9/2006 | Morvillo | B63B 39/00 |
| | | | 440/40 |
| 2007/0105463 A1* | 5/2007 | Mizutani | B63H 20/12 |
| | | | 440/61 S |
| 2008/0119094 A1* | 5/2008 | Mizutani | B63H 20/12 |
| | | | 440/53 |
| 2011/0143608 A1* | 6/2011 | Chiecchi | B63B 39/061 |
| | | | 440/53 |
| 2011/0263167 A1* | 10/2011 | Chiecchi | B63H 5/125 |
| | | | 440/53 |
| 2013/0110329 A1* | 5/2013 | Kinoshita | B63H 25/02 |
| | | | 701/21 |

* cited by examiner

ELECTRIC POWER STEERING ASSIST AND CONTROL OF A MARINE VESSEL

CROSS REFERENCE TO RELATED APPLICATIONS

This application claims the benefit of an earlier filing date from U.S. Provisional Application Ser. No. 62/197784 filed Jul. 28, 2015 the entire disclosure of which is incorporated herein by reference.

BACKGROUND OF THE INVENTION

Embodiments described herein relate to electrical power steering assist and control for marine applications. Embodiments described herein also relate to global positioning system (GPS) enabled control and speed-sensitive assist for marine applications.

Current marine vessel steering systems include hydraulic powered assist systems and mechanical flex-cable driven non-power assisted system. Mechanical systems are used on smaller and lower cost marine vessels (vessels having a length that is typically 18-22 feet or less), where assist is not considered essential and the application of a hydraulic powered steering system can be cost-prohibitive. Hydraulic systems are typically reserved for larger vessels, as such systems can be difficult or expensive to assemble.

SUMMARY OF THE INVENTION

An embodiment of a system for controlling a marine vessel includes a torque and/or position sensor configured to measure at least one of a torque applied by a steering wheel of the marine vessel and a rotational position of the steering wheel, and a processing device configured to receive a measurement of the steering wheel and electronically control a steering mechanism at a stern region of the marine vessel. The processing device is configured to estimate an angle of the steering wheel, determine a corresponding angle to be applied to the steering mechanism, and transmit a steering command based on the corresponding angle to an actuation device at the stern region.

An embodiment of a method of controlling a marine vessel includes receiving a measurement of at least one of a torque applied by a steering wheel of the marine vessel and a rotational position of the steering wheel at a processor, and estimating, by the processor, an angle of the steering wheel and determining a corresponding angle to be applied to a steering mechanism at a stern region of the marine vessel. The method also includes electronically transmitting a steering command based on the corresponding angle to an actuation device at the stern region, and controlling the steering mechanism by the actuation device in response to the steering command.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

The following description is merely exemplary in nature and is not intended to limit the present disclosure, application, or uses. It should be understood that throughout the drawings, corresponding reference numerals indicate like or corresponding parts and features. The Figures are provided to describe various embodiments, without limiting same.

Systems and methods are provided for control of a marine vessel. An embodiment of a control system for a marine vessel includes one or more sensors for detecting steering wheel position and/or torque, and a processor configured to detect steering wheel movement and communicate with a steering mechanism. The steering mechanism includes an actuator configured to apply force to a rudder and/or vessel engine. The steering assist unit detects movement of the steering wheel by an operator and transmits a signal to the steering mechanism to turn the vessel according to the operator's control of the steering wheel.

In one embodiment, the control system includes a steering assist unit configured to apply a reverse torque (i.e., torque in the opposite angular direction relative to the direction of steering wheel movement) to regulate the resistance felt by the operator and control the rotation angle and/or torque required to turn the steering wheel. The steering assist unit may be configured to provide speed-dependent assist, e.g., to make steering less sensitive or responsive at high speeds to increase safety and make steering more sensitive or responsive at low speeds.

In one embodiment, the steering assist unit is positioned at the shaft of a steering wheel or configured to connect to the shaft of the steering wheel to provide assist and/or control. The steering assist unit may be configured to provide steering assist and/or direct control of the steering system.

Embodiments described herein, in one embodiment, are provided for relatively large and powerful marine vessels (e.g., greater than about 15-22 feet and/or greater than about 150 horsepower) that typically utilize hydraulic steering systems. The embodiments provide a non-hydraulic electrically powered control and steering assist system that can replace hydraulic steering systems.

Figure 1:
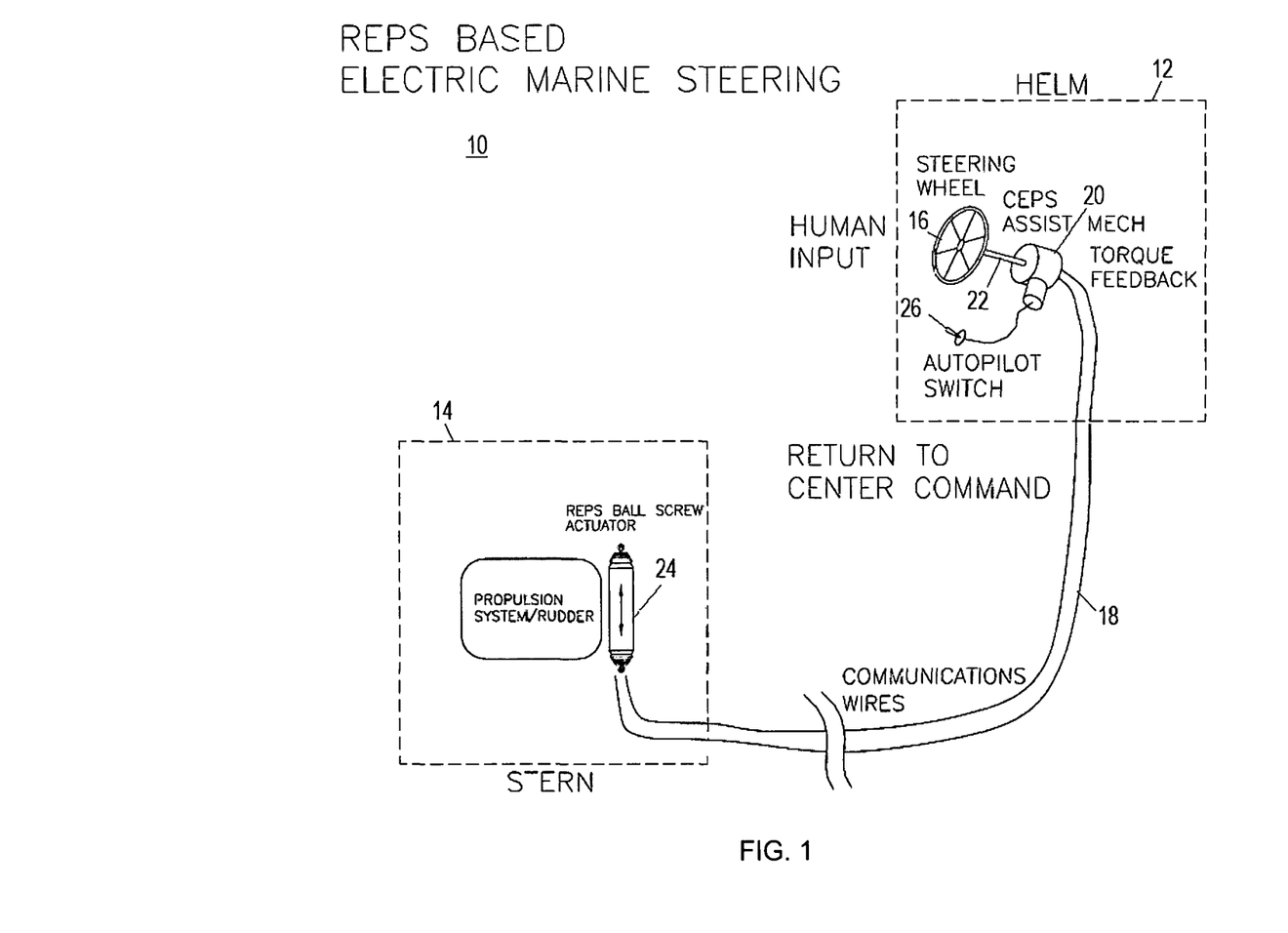
FIG. 1 depicts an embodiment of an electrical steering assist and/or control system for a marine vessel.

Referring now to FIG. 1, an embodiment of a control system 10 of a marine vessel is illustrated. The control system 10 includes a steering system 12 connected to a propulsion system 14. The steering system 12 receives user input in the form of an operator engaging a steering wheel 16, and transmits a corresponding command signal to the propulsion system 14 that controls the direction of the vessel. Transmission of the command signal is affected by one or more communication wires 18 or wirelessly. The steering system 12 and the propulsion system 14 may operate as a closed loop control system, where the steering system 12 transmits commands and receives directional and/or vessel speed information from one or more sensors at the propulsion system 14.

Components of the steering system 12, which may be included at the helm region of the vessel (but can be included at any suitable location), include the steering wheel 16 and an electrical steering assist unit 20 coupled to a steering shaft 22. An on-board torque and/or position sensor detects movement and/or position of the steering wheel 16, translates the applied steering wheel angle to a command signal, and transmits a command signal to the propulsion system 14. A steering mechanism including an actuator 24 receives the command and applies an appropriate force via the actuator 24 to a vessel engine and/or rudder 26. For example, the actuator 24 is a linear actuator that applies a force to turn the rudder and/or engine 26 at the stern of the vessel.

In one embodiment, the steering assist unit 20 is configured as a column electric power steering (CEPS) unit applied to a marine propulsion system. The steering assist unit 20 includes an electric motor to provide assist to the operator, e.g., by providing torque feedback to the steering wheel 16. The steering assist unit 20 may also be configured as a semi-autonomous or autonomous steering unit that transmits command messages to the actuator 24 independent of the steering wheel 16 and without engagement of the steering wheel 18 by an operator. In some instances, the steering assist unit 20 can take over control of the vessel, e.g., in response to another system (e.g., a GPS or a proximity monitoring system), to respond to various conditions, such as an oncoming obstruction or other vessel. The steering assist unit 20 can switch to autonomous mode in response to various conditions, or in response to an instruction by an operator, for example, via an autopilot switch 26.

The steering assist unit 20, in one embodiment, is positioned between the steering wheel 16 and the propulsion system 14. For example, the steering assist unit 20 may be installed on the shaft 22 or positioned within the steering column area of the helm. The steering assist unit 20 may be installed at the original manufacturer's steering shaft or a shaft designed explicitly for the steering assist unit 20.

In one embodiment, the actuator 24 is configured as a rack electric power steering (REPS) unit applied to a marine propulsion system. The REPS unit operates in conjunction with the steering assist unit 20, which may be configured as a CEPS unit connected to the steering wheel 16. The actuator 24 generally includes an electric motor and an actuator mechanism such as a linear actuator. A processor (e.g., disposed with on-board electronics) receives commands from the steering assist unit 20 and controls the motor to drive the actuator mechanism.

Figure 2:
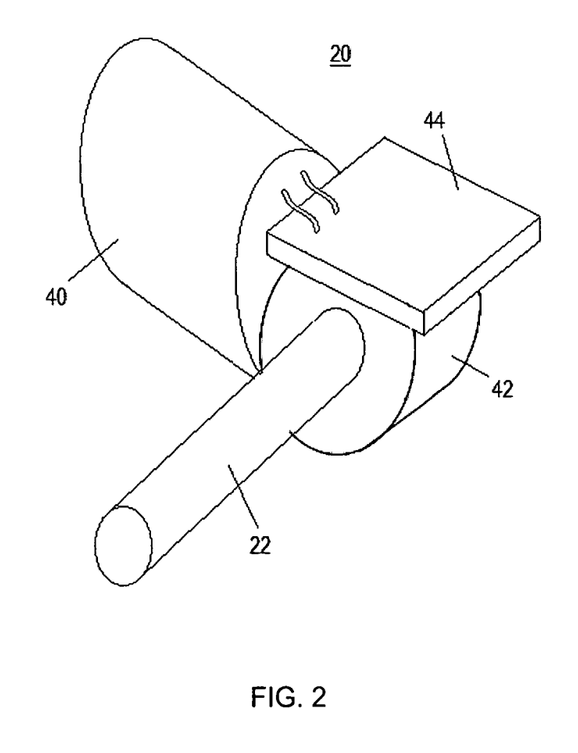
FIG. 2 depicts an embodiment of a column electric power steering (CEPS) unit for a marine vessel.

FIG. 2 shows an example of a configuration of the steering assist unit 20. In this example, the steering assist unit 20 is configured as a CEPS unit that includes an electric motor 40 (e.g., a 12 volt direct current (DC) motor) that drives a gear mechanism 42 such as a worm gear right angle drive-assist mechanism. An onboard electronics unit 44 includes suitable circuitry and processing devices to control the motor 40 in response to instructions from an operator and/or in response to sensing devices such as an onboard torque sensor.

In one embodiment, the steering assist unit 20 is physically fit within a marine steering column mounting area. The unit 20 may be powered with a power supply such as a marine 12 volt system located within the steering housing and/or helm.

For example, as shown in FIG. 2, the steering wheel shaft 22 can fit directly into an input shaft or adapter of the gear mechanism 42 or other suitable location on the steering assist unit 20. An output adapter is configured to connect the electronics unit 44 to a communication wire connected to the actuator 24. Alternatively, the electronics unit may include or connect to a wireless communication interface (e.g., a RF communication device such as a Bluetooth device) that communicates with a wireless interface at the actuator 24. The steering assist unit 20 (or components thereof) may be disposed in a housing having environmental protection based on the properties of the marine vessel system.

Figure 3:
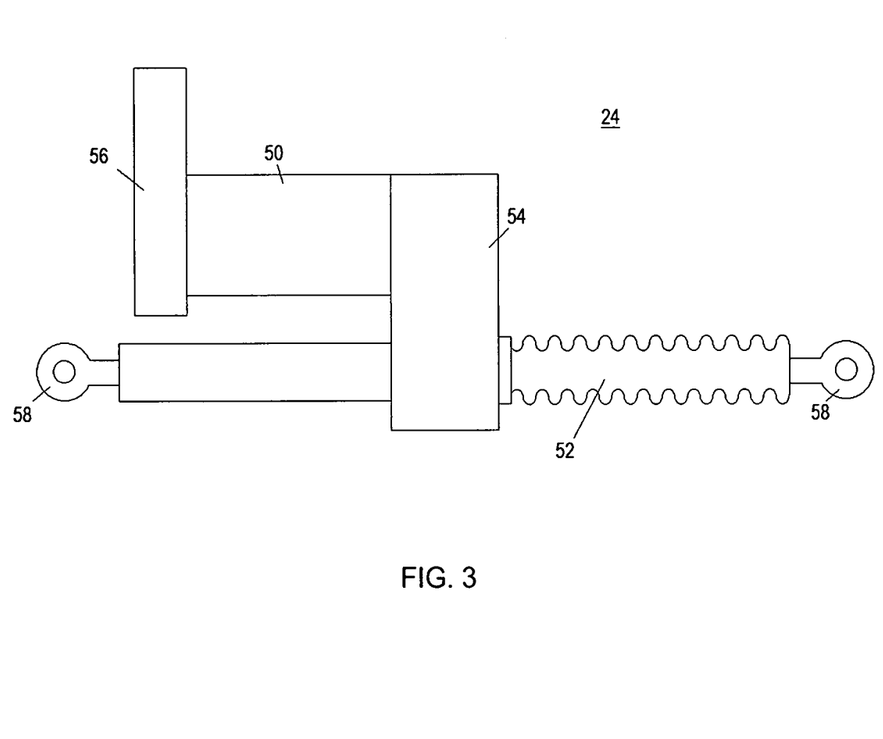
FIG. 3 depicts an embodiment of a rack electric power steering (REPS) unit for a marine vessel.

FIG. 3 illustrates an example of the actuator 24, which in this example is a REPS unit. The actuator 24 includes an electric motor 50, such as a 12 volt direct current motor, which drives a linear actuator 52, such as a rod or elongated screw. Electric motor torque is translated to linear motion of the actuator 52 by a coupling or gear mechanism 54, such as a ball screw assembly. An electronics unit 56 includes a torque sensor and a processor for receiving steering commands from the steering assist unit 20 and controlling the motor 50. In one embodiment, the actuator includes or is connected to spherical end joints 58 that can be mounted or connected directly to a motor steering mount linkage at the vessel engine. The actuator 24 includes suitable housing or protective components to provide environmental protection that is suitable for marine requirements.

The steering assist unit 20 and/or the actuator 24 can be installed as original manufacturer equipment (OEM), or installed on pre-existing components without requiring substantial reconfiguration of the propulsion system.

Figure 4:
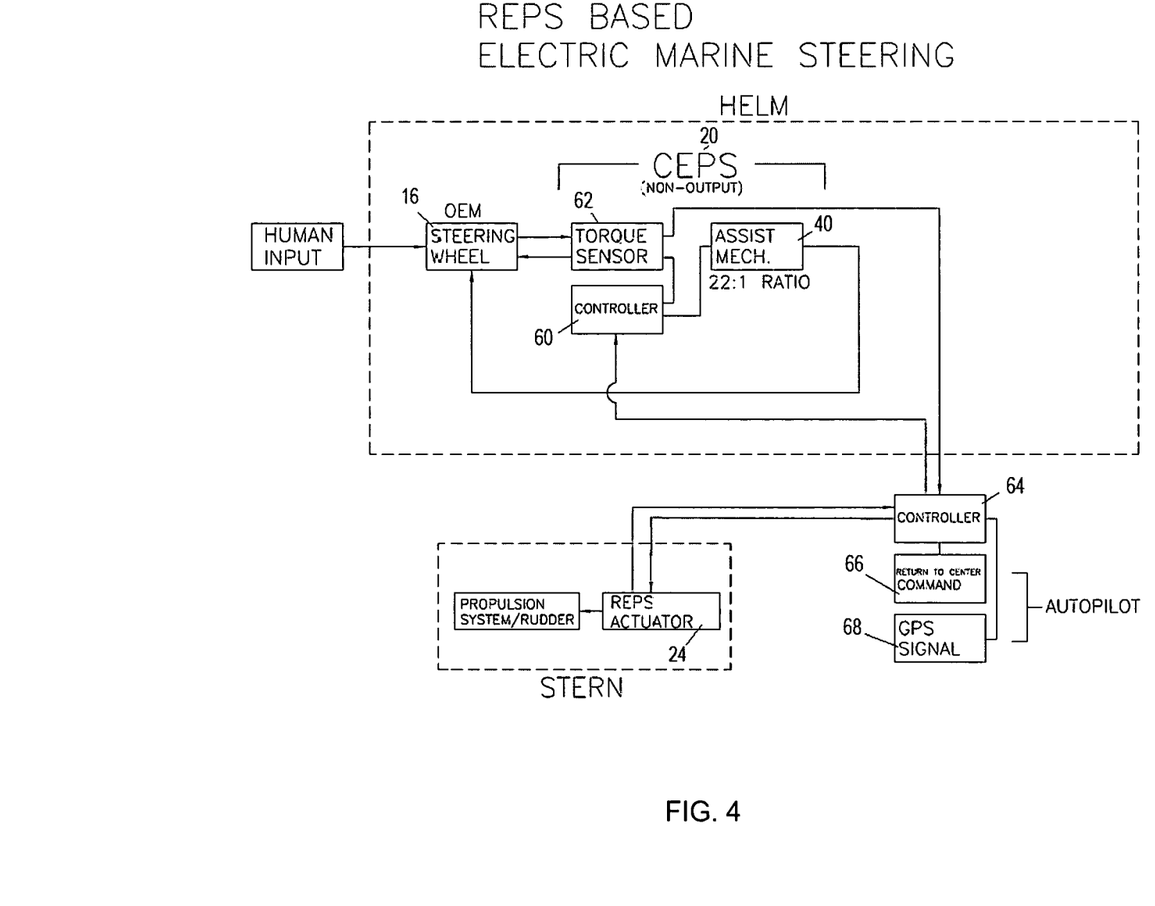
FIG. 4 depicts a block diagram of communication flow of an electrical steering assist and/or control system.

FIG. 4 illustrates an example of a block diagram of a command flow of a marine vessel control system, which may be executed by one or more processing devices (also referred to as processors) to affect various methods of controlling a marine vessel. For example, the steering assist unit 20 includes a feedback controller 60 that receives steering wheel torque and/or position information from a torque and/or position sensor 62 disposed at the steering wheel 16. A vessel steering controller 64 also receives torque and/or position information from the sensor 62 and transmits steering commands to the actuator 24. In response, directional and/or speed information may be transmitted to the vessel steering controller 64 from the actuator 24. The controller 60 may be incorporated into the steering assist unit 20 (e.g., in the electronics unit 44). The controller 64 may also be disposed in the steering assist unit 20 or in another location. Although embodiments are described with reference to the controller 60 and/or the controller 64, they are not so limited. The methods described herein may be performed by any suitable processor or combination of processors at any suitable location(s).

In one embodiment, the system 10 includes various control or processing modules such as a steering wheel position control module 66 and a location signal processing module 68. In one embodiment, the controller 64, the position control module 66 and/or the location signal processing module 68 are configured to control the vessel as part of an autopilot mode.

The system 10 is configured to perform various vessel control and steering assist functions. The following descriptions illustrate various embodiments of a method of controlling aspects of a marine vessel. It is noted that, although the embodiments are described in conjunction with the system 10, the embodiments are not so limited and may be performed in conjunction with any suitable processing device or system.

An embodiment of a method of controlling a marine vessel includes receiving a human input at the steering wheel 16, and measuring a rotational position and/or torque of the steering wheel 16 via a position and/or torque sensor such as the torque sensor 62. Position and torque measurements may be performed by a combined positon and torque sensor or by separate position sensor(s) and torque sensor(s). In one embodiment, the position and/or torque sensor includes an absolute position sensor. The position and/or torque sensor converts the mechanical signal provided by the steering wheel 16 to a processor such as the controller 64, which generates a torque command to an electric motor such as the motor 50 in a REPS unit to cause the actuator 24 to turn a rudder and/or engine of the vessel. For example, the controller 64 detects a rotational position of the steering wheel 16, estimates an angle (e.g., in degrees or radians) of the steering wheel relative to a reference point (e.g., a center position of the steering wheel), determines a corresponding angle to which the rudder and/or engine should be rotated, and transmits an appropriate command to the actuator 24.

The method may also include steering assist functions performed by the steering assist unit 20. The steering assist unit 20 receives torque and/or position information from the sensor 62 and provides various levels of assist. In one embodiment, the steering assist unit 20 controls the motor 40 to apply a feedback torque to the steering wheel 16. The feedback torque is in an angular direction opposite to the direction in which the steering wheel 16 is being rotated. The feedback torque may be applied to provide a selected level of resistance so that the operator must exert some level of effort to turn the steering wheel 16. This can increase safety and control by discouraging the operator from turning the steering wheel 16 too quickly or over-rotating the steering wheel 16. This application of feedback torque is useful, particularly in electronic control systems such as steer-by-wire that do not present any inherent resistance to turning the steering wheel.

The system 10 may be configured to apply torque and/or steering control in response to various other conditions. In one embodiment, the system 10 is configured to provide speed-dependent steering assist. A vehicle speed sensor is incorporated into the marine vessel and provides vessel speed measurements to the controller 60. Based on the speed of the vessel, the controller 60 applies a variable level of feedback torque. For example, the controller 60 directs the motor 40 to increase an amount of feedback torque as speed increases or exceeds one or more speed thresholds. Higher amounts of feedback torque at high speeds can prevent the operator from turning too quickly, thereby increasing safety. Likewise, the controller 60 can direct the motor 40 to apply lower amounts of feedback torque at low speeds so that steering is more responsive.

Another method of providing speed-dependent steering assist includes calibrating or configuring the controller 64 to change a relationship between the steering angle of the steering wheel 16 ($\theta_W$) and the corresponding angle applied by the actuator 24 ($\theta_A$). For example, the controller 64 calculates the corresponding angle $\theta_A$ based on a ratio between the steering wheel angle and the actuator ($\theta_W/\theta_A$). At higher speeds, the controller 64 transmits a steering command based on a higher value of the ratio (e.g., greater than one), and at lower speeds, the controller 64 transmits a steering command based on a lower value of the ratio (e.g., less than or equal to one). In this way, the controller 64 can reduce the responsiveness and make it harder for an operator to make sharp turns at high speeds.

The controller 60 and/or the controller 64 may further be in communication with a geographic location system such as a GPS system, which may be utilized to provide automated location guidance. In one embodiment, the controller 60 receives geographic location information and provides different levels of feedback based on the geographic location of the vessel. For example, the controller 60 is configured to direct the electric motor 40 to provide lower levels of feedback torque when the marine vessel is within a selected range of a shore or docking location, e.g., to provide additional assistance when tight maneuvers are needed. In addition, the controller 64 can reduce the ratio used to translate steering wheel angle to actuator angle to increase steering sensitivity within the selected range.

Speed and/or geographic location dependent assist control can prove useful in various situations. For example, under low speeds in a docking maneuver, the operator may fight conditions such as wind and tight spaces that are of less concern when travelling at higher speeds and/or when further from the shore. Such assist control provides additional assistance for the operator, who may need to rapidly rotate the wheel many degrees of rotation, to reduce the potential for fatigue.

In one embodiment, the method includes receiving steering wheel position information and applying torque to the steering wheel 16. For example, the controller 60 is configured to receive position information from a sensor and identify the rotational center of the steering wheel 16. The position control module 66 (or other suitable processor) determines whether the steering wheel 16 is at center and whether the operator is applying a torque to the steering wheel. If no torque is being applied and the steering wheel is off center, the controller 60 and/or position control module 66 transmits a torque command to the motor 40 to apply a torque that causes the steering wheel 16 to rotate back to center.

In one embodiment, the method includes receiving steering wheel position information and applying torque to the steering wheel 16 to simulate an end stop and prevent the steering wheel 16 from being rotated to the wheel's mechanical end stop. For example, the controller 60 receives position information and determines the rotational position of the steering wheel 16 with respect to the mechanical end stop. The controller 60 may direct the motor 40 to apply a torque to dampen steering or restrict further rotation when the rotational position of the steering wheel 16 is within a selected angular distance from the mechanical end stop. The controller 60 may determine various steering or operational conditions and respond thereto by applying an appropriate torque. For example, the position and/or torque sensor can be used to monitor steering wheel vibrations and apply appropriate torque to dampen such vibrations.

The system 10 may be configured to provide autonomous control of a marine vessel. For example, the controller 64 may be configured to provide autopilot capability that can be activated by the operator (e.g., via the autopilot switch 28) or made available in certain conditions. For example, the controller 64 is configured to allow a user to select autopilot at geographic locations that are a selected distance from shore or otherwise in areas conducive to higher speeds. In another example, the controller 64 is configured to allow a user to select autopilot at low speeds or when close to the shore, e.g., to allow the controller to autonomously perform docking maneuvers. The system 10 may provide automated vessel control to control speed and direction based on GPS and/or heading information.

Embodiments described herein provide various advantages. For example, the steering assist unit provides various levels of feedback assist and/or steering sensitivity control to assist an operator and/or prevent the operator for over-rotating the steering wheel.

Embodiments described herein provide an effective steering assist and/or control system that can be used in both small and large vessels, and that can be used in place of hydraulic systems. Hydraulic powered assist systems can present a number of problems, such as leaks and a lack of programmable control, and can be difficult or expensive to assemble.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A system for controlling a marine vessel comprising:
   a torque and/or position sensor configured to measure at least one of a torque applied by a steering wheel of the marine vessel and a rotational position of the steering wheel; and
   a processing device configured to electronically control a steering mechanism at a stern region of the marine vessel, the processing device configured to estimate an angle of the steering wheel, determine a corresponding angle to be applied to the steering mechanism, and transmit a steering command based on the corresponding angle to an actuation device at the stern region, the processing device being further configured to receive a geographic location of the marine vessel from a global positioning system and determine a feedback torque based on the geographic location of the marine vessel.

2. The system of claim 1, wherein the actuation device includes an electric motor configured to drive a linear actuator, and includes a processor configured to receive the steering command from the processing device.

3. The system of claim 1, wherein the processing device is configured to transmit the steering command to the actuation device to steer the vessel without a mechanical or hydraulic connection between the steering wheel and the actuation device.

4. The system of claim 1, further comprising a steering assist unit coupled to the steering wheel, the steering assist unit including an electric motor configured to apply the feedback torque to the steering wheel in response to movement of the steering wheel, the feedback torque being in a rotational direction that is opposite a rotational direction of the movement of the steering wheel.

5. The system of claim 4, wherein the steering assist unit is a column electrical power steering (CEPS) unit disposed at a helm region of the vessel, and the actuation device is a rack electrical power steering (REPS) unit.

6. The system of claim 4, wherein the steering assist unit is configured to apply an amount of the feedback torque based on a speed of the marine vessel.

7. The system of claim 4, wherein the steering assist unit is configured to increase an amount of the feedback torque in response to a speed of the marine vessel exceeding a selected threshold.

8. The system of claim 4, wherein the steering assist unit is configured to apply an amount of the feedback torque based on the rotational position of the steering wheel relative to a mechanical end stop.

9. The system of claim 4, wherein the steering assist unit is configured to autonomously apply a selected amount of the feedback torque to return the steering wheel to a center position.

10. The system of claim 4, wherein the steering assist unit is configured to autonomously control the actuation device to steer the vessel.

11. A method of controlling a marine vessel, the method comprising:
    receiving a measurement of at least one of a torque applied by a steering wheel of the marine vessel and a rotational position of the steering wheel at a processor;
    estimating, by the processor, an angle of the steering wheel and determining a corresponding angle to be applied to a steering mechanism at a stern region of the marine vessel;
    receiving, by the processor, a geographic location of the marine vessel from a global positioning system and determining a feedback torque based on the geographic location of the marine vessel, the feedback torque being determined to be a first level of feedback torque when the geographic location of the marine vessel is within a selected range of a shore or docking location, and the feedback torque being determined to be a second level of feedback torque when the geographic location of the marine vessel is not within the selected range;
    electronically transmitting a steering command based on the corresponding angle to an actuation device at the stern region; and
    controlling the steering mechanism by the actuation device in response to the steering command.

12. The method of claim 11, wherein the actuation device includes an electric motor configured to drive a linear actuator, and includes a processor configured to receive the steering command from the processing device.

13. The method of claim 11, wherein the processing device is configured to transmit the steering command to the actuation device to steer the vessel without a mechanical or hydraulic connection between the steering wheel and the actuation device.

14. The method of claim 1, further comprising applying the feedback torque to the steering wheel by a steering assist unit in response to movement of the steering wheel, the steering assist unit including an electric motor configured to apply the feedback torque being in a rotational direction that is opposite a rotational direction of the movement of the steering wheel.

15. The method of claim 14, wherein the steering assist unit is a column electrical power steering (CEPS) unit disposed at a helm region of the vessel, and the actuation device is a rack electrical power steering (REPS) unit.

16. The method of claim 14, wherein the steering assist unit is configured to apply an amount of the feedback torque based on a speed of the marine vessel.

17. The method of claim 14, wherein the steering assist unit is configured to increase an amount of the feedback torque in response to a speed of the marine vessel exceeding a selected threshold.

18. The method of claim 14, wherein the steering assist unit is configured to apply an amount of the feedback torque based on the rotational position of the steering wheel relative to a mechanical end stop.

19. The method of claim 14, wherein the steering assist unit is configured to autonomously apply a selected amount of the feedback torque to return the steering wheel to a center position.

20. The method of claim 14, wherein the steering assist unit is configured to autonomously control the actuation device to steer the vessel.

\* \* \* \* \*